United States Patent
Allison

[11] 4,044,283
[45] Aug. 23, 1977

[54] ELECTROMECHANICAL RESONATOR

[75] Inventor: William Allison, Huntington Station, N.Y. 11743

[73] Assignee: Schiller Industries, Inc., Troy, Mich.

[21] Appl. No.: 624,791

[22] Filed: Oct. 22, 1975

[51] Int. Cl.² .............................................. H02K 33/00
[52] U.S. Cl. ..................................... 318/128; 310/25; 58/23 TF; 350/6
[58] Field of Search ....................... 310/25, 22, 21, 29, 310/36–39; 58/23 TF; 331/154, 156; 350/6; 89/457, 409; 318/127–132

[56] References Cited
U.S. PATENT DOCUMENTS

| | | | |
|---|---|---|---|
| 3,308,313 | 3/1967 | Favre | 310/36 |
| 3,428,879 | 2/1969 | Marti | 310/36 |
| 3,431,808 | 3/1969 | Oudet et al. | 310/36 UX |
| 3,491,258 | 1/1970 | Siefert | 310/36 |
| 3,609,485 | 9/1971 | Dostal | 318/132 |
| 3,642,344 | 2/1972 | Corker | 350/6 |
| 3,666,974 | 5/1972 | Dostal | 58/23 TF X |
| 3,678,308 | 7/1972 | Howe | 310/36 |
| 3,921,045 | 11/1975 | Reich et al. | 318/127 |

*Primary Examiner*—Donovan F. Duggan
*Attorney, Agent, or Firm*—Reising, Ethington, Barnard

[57] ABSTRACT

An electromechanical resonator is disclosed for use in optical scanning systems. The resonator comprises a torsionally resonant system including a torsion rod having one end fixed to a nodal zone member and an oscillatory mass at the free end. A flexurally resonant system includes a pair of oppositely disposed flexure arms extending transversely of the torsional axis and having their inner ends fixed to the nodal zone member. The nodal zone member is suspended by a coupling spring from a frame member and the coupling spring permits energy transfer from the flexurally resonant system to the torsional resonant system through nodal zone member. The resonant systems are maintained in oscillation by electrodynamic means coupled with the flexure arms.

22 Claims, 5 Drawing Figures

ELECTROMECHANICAL RESONATOR

This invention relates to electromechanical resonators and more particularly to a balanced resonator with a pair of opposed resonant systems. The invention is especially useful in optical scanners.

BACKGROUND OF THE INVENTION

In optical scanning systems, and in other applications, electromechanical resonators are used as modulators for causing periodic deflection of a light beam. It is desirable in certain optical scanning systems to produce beam deflection which varies as a sinusoidal function of time at a desired frequency. This can be achieved by a torsionally resonant system which includes a torsion rod with a mirror mounted thereon and means to sustain the torsional system in oscillation at the natural frequency thereof. A torsional resonator exhibits a high Q (quality factor) and can be sustained in sinusoidal oscillation by a simple electrodynamic drive means. The power requirements are small since it is only necessary to supply the losses arising from hysteresis, windage (air resistance), and the like. No bearings are required and the device has a long, maintenance free life.

A torsional resonator is desired for applications in which a relatively short axial dimension is required and a relatively long lateral dimension is permissible. Further, the performance of the resonator is to be substantially independent of the installation mounting or clamping arrangement. Additionally the resonator is to be of such design that it may be manufactured without requiring a high degree of dimensional precision of the parts and assembly.

THE PRIOR ART

In the prior art, a torsional resonator especially adapted for optical scanning is disclosed in the Dostal U.S. Pat. No. 3,609,485. In this resonator, a torsion rod has one end fixed in a base plate and the free end carries a mirror as a part of the torsionally resonant system. This resonator falls into a class known as unbalanced torsional resonators and is disadvantageous in that its performance depends upon the inertia of the base plate or installation structure and the quality of the clamping or attachment means.

A prior art torsional resonator, which falls into the class known as balanced torsional resonators, is set forth in the Siefert U.S. Pat. No. 3,491,258. This patent discloses an arrangement known as a torsion-to-torsion resonator in which two torsionally resonant systems are opposed so that each supplies the reaction force required by the other and the performance is substantially independent of the supporting structure and the clamping or attachment means. One difficulty with this arrangement is that it requires a relatively long axial length because two resonant rods are required in end-to-end relationship. Another difficulty is that the attachment of the torsionally resonant systems to the supporting structure can be accomplished only at the nodal point which exists between the two resonant rods or else the performance of the resonator is affected. It is difficult, in practice to precisely locate the nodal point point and to achieve a mounting attachment which does not adversely affect the oscillatory motion of the torsion rods. In the resonator of the Siefert patent, this adverse affect is purportedly minimized by use of a spring coupling of the nodal "point" to the supporting structure.

Balanced resonators have been disclosed in the prior art with means for attaching the resonant system to a supporting structure without need for "point contact" support at the nodal point. This is provided in a torsion-to-torsion resonator as disclosed in the Kuffer U.S. Pat. No. 3,782,101 by means of a median portion of relatively high torsional moment of inertia between the torsion rods and by attaching the median portion through an elastic arm to the support structure. In this torsion-to-torsion resonator the problem of attachment is alleviated by the median portion but the device requires an end-to-end arrangement of the torsion rods through the intermediary of the median portion. A similar torsion-to-torsion resonator is shown in the Favre U.S. Pat. No. 3,308,313 in which the torsion rods are connected end-to-end through the intermediary of a median plate and the plate is suspended from the support structure by a set of four spaced elastic rods.

SUMMARY OF THE INVENTION

According to this invention, a balanced resonator is provided which exhibits the desired characteristics of a torsionally resonant system without the need for end-to-end torsion rods and the consequent long axial dimension. This is accomplished by combining a pair of resonant systems in a side-by-side arrangement; preferably a torsionally resonant system and a flexurally resonant system and combined to form a torsion-to-flexure resonator. Further, the torsionally resonant system and the flexurally resonant system are operatively connected without need for attachment at a nodal point. This is accomplished by connection of the resonant systems through the intermediary of a nodal zone member which is attached to a supporting structure through a coupling spring. The nodal zone member allows side-by-side disposition of the two resonant systems in a "folded" arrangement to minimize the axial length of the resonator.

More particularly, the resonator of this invention comprises a torsionally resonant system with a torsional element fixed to a nodal zone member and a flexurally resonant system with a pair of flexurally resonant elements fixed to the nodal zone member and extending oppositely therefrom transversely of the torsion element; the resonant systems are suspended from a frame member by a coupling spring attached to the nodal zone member. An electrodynamic means is coupled with one of the resonant systems for driving it into oscillation whereby the other resonant system is driven in counter-phase oscillation. Preferably, the torsion rod and the torsional axis are parallel to and laterally offset from the flexure axis of the flexure arms. The coupling spring is yieldable in the plane of oscillation whereby energy is supplied from the driving resonant element to the driven resonant element. The coupling spring comprises a pair of flat leaf portions parallel to the torsion axis and extending radially therefrom to provide the desired degree of stiffness along the various axes of the resonator. The torsion rod is fixed to a base portion of the nodal zone member and the flexure arms along with the coupling spring are fixed to a pedestal portion of the nodal zone member to give a side-by-side arrangement of the resonant systems.

DETAILED DESCRIPTION

Figure 1:
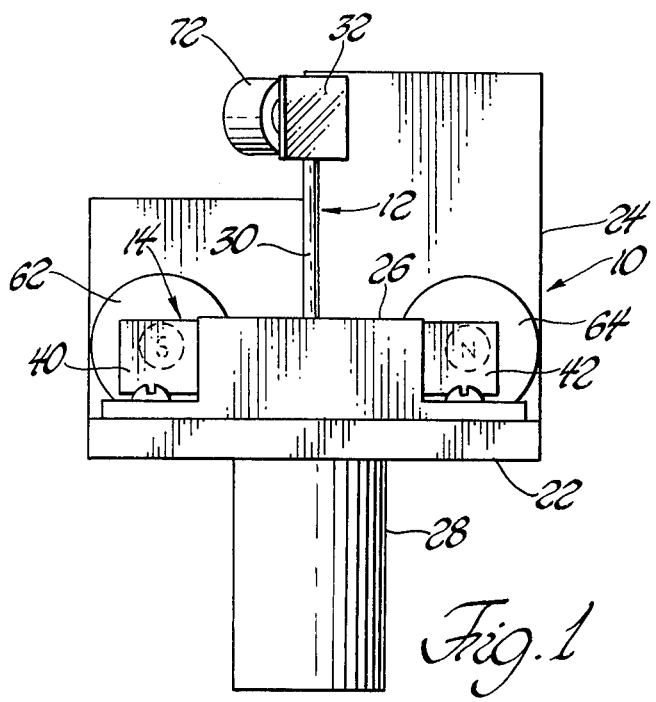
Figure 2:
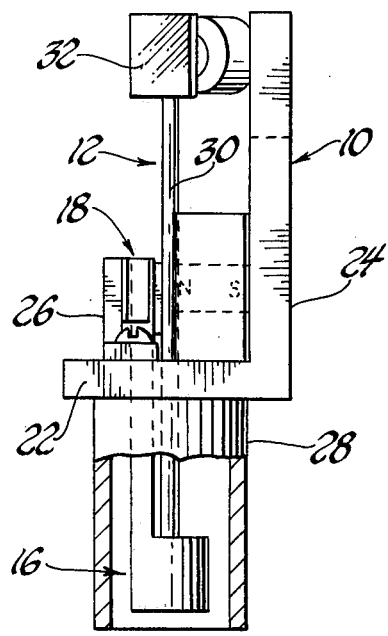
Figure 3:
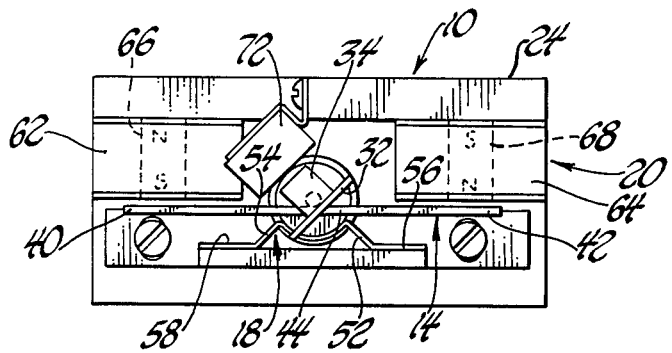
Figure 5:
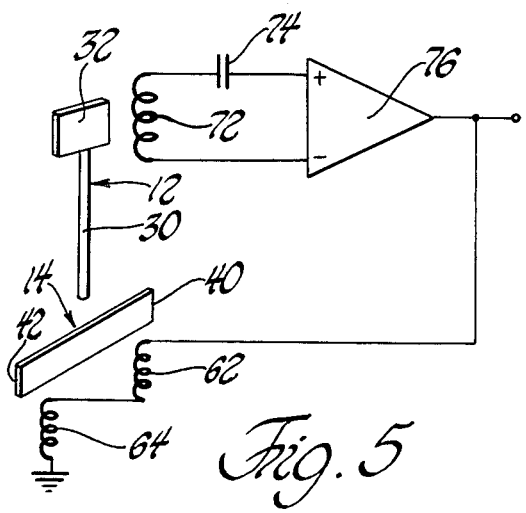
Figure 4:
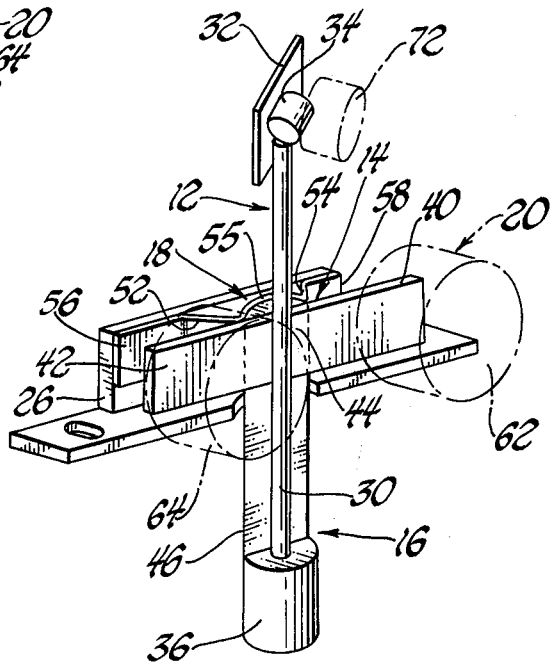

A more complete understanding of this invention may be obtained from the detailed description that follows, taken with the accompanying drawings in which:

FIG. 1 is a front elevation view of the resonator;
FIG. 2 is a side elevation view of the resonator;
FIG. 3 is a plan view;
FIG. 4 is a perspective view; and
FIG. 5 is a schematic diagram of an energizing circuit for the resonator.

Referring now the to drawings, there is shown an illustrative embodiment of the invention in an electromechanical resonator especially adapted for use in an optical scanning system. It will be appreciated, as the description proceeds, that the resonator may be mounted in any desired attitude without appreciable effect on its performance. It will also be appreciated that the resonator of this invention may be useful in applications other than optical scanning.

The structure of the electromechanical resonator of this invention will now be described in detail with reference to FIGS. 1 through 4. The resonator, in general, comprises a frame 10 which supports a torsionally resonant system 12 and a flexurally resonant system 14 which are operatively joined to a nodal zone member 16. The nodal zone member is suspended from the frame 10 by a coupling spring 18. An electrodynamic means 20 is coupled to the flexurally resonant system 14 for driving it into oscillation which, in turn, causes sustained counterphase oscillation of the torsionally resonant system 12.

In greater detail, the frame 10 comprises a base plate 22 and an integral back plate 24. A frame member 26 is seated upon the base plate 22 and is removably secured thereto by screw threaded fasteners. As will be described in detail below, the frame member 26 supports a subassembly including the resonant systems. The frame 10 further comprises a mounting member or tube 28 which is cylindrical in cross-section and adapted to be inserted into a receiving clamp of the apparatus, such as an optical scanner, in which the resonator is to be used. The cylindrical mounting tube 28 permits rotative positioning of the resonator about its principal axis which is taken as the oscillatory axis of the torsionally resonant system 12.

The torsionally resonant system 12 comprises a torsion rod 30 which is preferably of elongate cylindrical shape and constructed of a material, such as a nickel-iron alloy which has a substantially constant elastic modulus with temperature changes and which is highly resistant to fatigue. The torsion rod 30 has its fixed end secured, as by brazing, to the nodal zone member 16. The free end of the torsion rod supports an oscillatory mass which comprises an optical reflector or mirror 32 which is adapted for optical beam deflection. The oscillatory mass also comprises a permanent magnet 34 attached to the rear surface of the mirror 32 for purposes to be described below. The torsionally resonant system 12 has a resonant frequency dependent upon its physical parameters. The physical parameters are preferably established according to well known principles, at values which provide a predetermined resonant frequency and a high Q (quality factor).

The flexurally resonant system 14 comprises a pair of flexure elements or spring arms 40 and 42. The spring arms are preferably formed as a unitary flat leaf spring which is fixed, as by brazing, at its median portion 44 to the upper end of a post or pedestal portion 46 of the nodal zone member 16. The leaf spring which forms the spring arms 40 and 42 is preferably constructed of a material, such as a nickel-iron alloy which has a substantially constant elastic modulus with temperature changes and which is highly resistant to fatigue. Such material is also magnetic and coacts with the electrodynamic means 20, as will be described below. Each of the spring arms is tuned to have a natural frequency of vibration in the flexure mode which is equal to the resonant frequency of the torsionally resonant system 12.

The nodal zone member 16 serves to operatively interconnect the torsionally resonant system 12 and the flexurally resonant system 14 in a balanced resonator arrangement, in other words, the reaction torque for one resonant system is applied through the nodal zone member by the other resonant system. The nodal zone member exhibits a relatively high torsional stiffness so that the torque transmitted by it does not cause any significant elastic deformation or twist of the member. Thus there is no appreciable relative movement of one portion of the nodal zone member to another portion thereof and, in that respect, it is analogous to the points in the nodal plane of a torsion-to-torsion balanced resonator. However, the nodal zone member affords a desirably large volume and surface area which can be engaged for support purposes without affecting the performance of the resonant system. Accordingly, the nodal zone member provides a zone, which may be as large as desired, for attachment of the supporting or suspension means for the resonant systems. The nodal zone member is suitably constructed of stainless steel and preferably has a torsional stiffness which is at least several times, preferably about 5 times, greater than the torsional stiffness of the torsion rod 30.

It is noted that the nodal zone member 16 is of a configuration which permits the torsionally resonant system 12 and the flexurally resonant system 14 to be disposed in side-by-side relationship. The torsion rod 30 is mounted on the base portion 36 and the flexure arms 40 and 42 are mounted on the pedestal portion 46 on the same side of the nodal zone member, such that it constitutes a "folded" juncture of the resonant systems. The length of the pedestal portion and placement of the flexure arms thereon are selected for the best space utilization by the resonant systems.

The coupling spring 18 serves as a support or suspension means for the resonant systems relative to the frame 10; it also enables power to be transmitted from the driving resonant system to the driven resonant system to start and maintain oscillation of the latter. In the illustrative resonator, the flexurally resonant system 14 is energized by the electrodynamic means 20, which will be described below, to cause oscillation thereof at its resonant frequency. To permit energy transfer to the torsionally resonant system, the nodal zone member is suspended by the coupling spring 18 in such a manner that it is permitted to be moved bodily in a rotative sense to a very limited degree. The coupling spring 18 includes a pair of spaced leaf spring arms or spokes 52 and 54 connected respectively between the nodal zone member 16 and the frame member 26. The coupling spring is preferably formed as a unitary flat leaf spring in a configuration having a web or saddle portion 55 interconnecting the spoke portions 52 and 54 and having foot portions 56 and 58 on the respective spokes. The saddle portion 55 is secured, as by brazing, to the upper end of the pedestal portion 46 of the nodal zone member. The foot portions 56 and 58 are joined, as by brazing, to the frame member 26. It is noted that the spokes 52 and 54 of the coupling spring lie in planes which are parallel to and pass through the torsion axis of the torsion rod 30. This arrangement provides a relatively low torsional stiffness over a small angular range, preferably a few minutes of arc, and a relatively high degree of stiffness in a direction parallel to and transversely of the torsion axis. Further, the radial spokes of the coupling spring result in negligible translatory movement of the nodal zone member as it undergoes rotation. The resonant frequency of the coupling spring and the mass it supports should be substantially lower than the resonant frequency of the systems 12 and 14. It should, for example, be at least 30% lower. The coupling spring is preferably constructed of a spring metal such as spring brass or stainless steel.

As noted above, the resonant systems 12 and 14, the nodal zone member 16 and the coupling spring 18 form a subassembly supported by the frame member 26. The frame member 26 is removably attached to the base plate 22 of the frame. The frame member 26 is positioned so that the nodal zone member extends into the mounting sleeve 28.

The resonator is set into oscillation and sustained in oscillation by the electrodynamic means 20. The electrodynamic means comprises a pair of drive coils 62 and 64 which are mounted on the back plate 22 adjacent the flexure arms 40 and 42 respectively. The drive coil 62 has a permanent magnet core 66 and the drive coil 64 has a permanent magnet core 68. It is noted that the permanent magnet cores 66 and 68 are oriented with opposite polarity relative to the respective flexure arms.

In order to energize the electrodynamic means, namely the drive coils 62 and 64, the resonator is connected in a feedback oscillator in a known manner, as illustrated in FIG. 5. For this purpose, a pickup or feedback coil 72 is mounted by a suitable bracket on the back plate 24 of the frame and adjacent the permanent magnet 34 on the back of the mirror 32. As shown in FIG. 5, the pickup coil 72 is connected through a phase shift capacitor 74 to the input of the amplifier 76. The output of the amplifier is connected across the series connection of the drive coils 62 and 64.

In operation of the resonator, oscillation is initiated by energizing the amplifier 76 which will supply a small current through the drive coils 62 and 64. This will produce a magnetic flux in one of the drive coils which reinforces the flux of its permanent magnet core and will produce a flux in the other drive coil which opposes the flux of its permanent magnet core. Accordingly, the flexure arms 40 and 42 will be set into motion in an opposite phase relationship. The torque produced by the flex arms on the nodal zone member 16 will cause slight bodily rotation thereof which will impart a slight rotational movement to the torsion rod 30. This will initiate oscillation of the torsionally resonant system 12 and the motion of the permanent magnet 34 will induce in the feedback coil 72 a signal which is applied through the phase shift capacitor 74 to the input of the amplifier 76. The amplifier produces an output signal which is of proper phase to sustain the oscillations of the flexurally resonant system, which in turn sustains the oscillations of the torsionally resonant system. The oscillations are sustained at a frequency equal to the resonant frequency of the torsionally resonant system and the losses of the resonator are supplied by the electrical energy supplied through the amplifier and the driving coils of the electrodynamic means.

Although the description of this invention has been given with reference to a particular embodiment, it is not to be construed in a limiting sense. Many variations and modifications will now occur to those skilled in the art. For a definition of the invention reference is made to the appended claims.

The embodiments of the present invention in which an exclusive property or privilege is claimed are defined as follows:

1. A resonator comprising a frame member, a nodal zone member, a first resonant system including a torsion element having one end fixed to the nodal zone member and an oscillating mass fixed to the other end, a second resonant system fixed to the nodal zone member and disposed on the same side of the nodal zone member as the first resonant system and in side-by-side relation with the first resonant system, a coupling spring suspending said nodal zone member from said frame member and means coupled with one of said resonant systems for driving it into oscillation whereby the other resonant system is driven in counterphase oscillation.

2. The invention as defined in claim 1 wherein said second resonant system includes a pair of flexurally resonant elements extending oppositely from the nodal zone member and transversely of the torsion element.

3. The invention as defined in claim 2 wherein said torsion element is a torsion rod and said flexurally resonant elements are flexure arms each tuned to the same resonant frequency as said first resonant system.

4. The invention as defined in claim 3 wherein said torsion rod has a torsional axis which is parallel to and laterally offset from the flexure axis of the flexure arms.

5. The invention as defined in claim 3 wherein said coupling spring is elastically yieldable in a plane normal to the torsional axis to provide energy transfer from the driving resonant system to the driven resonant system.

6. The invention as defined in claim 5 wherein said coupling spring has a greater stiffness in a plane parallel to said torsional axis and a plane perpendicular to said torsional axis than the angular stiffness about said torsional axis.

7. The invention as defined in claim 4 wherein said flexure arms are fixed to the nodal zone member at a location alongside a point intermediate the ends of the torsion rod.

8. The invention as defined in claim 7 wherein said coupling spring is yieldable in the plane of oscillation and is attached to the nodal zone member at a location alongside a point intermediate the ends of the torsion rod.

9. The invention as defined in claim 8 wherein said coupling spring comprises a pair of flat leaf portions parallel to said torsional axis in spaced relation and each portion being connected with the nodal zone member and with the frame member.

10. The invention as defined in claim 9 wherein said nodal zone member has a base portion and a pedestal portion, said torsion rod being fixed to the base portion and the flexure arms being fixed to the pedestal portion.

11. The invention as defined in claim 10 wherein said coupling spring further comprises a web portion joining the leaf portions, said web portion being connected with the free end of said pedestal portion of the nodal zone member.

12. The invention as defined in claim 11 wherein each of said leaf portions of the coupling spring is disposed in the same plane as said torsional axis.

13. A resonator for light beam deflection comprising, a frame member, a nodal zone member having a base portion and a pedestal portion, a torsion rod having one end fixed to the base portion of the nodal zone member and extending therefrom in the same direction as said pedestal portion, an oscillatory mass including a light beam reflector fixed to the other end of said torsion rod, a pair of flexurally resonant elements fixed to said pedestal portion of the nodal zone member and extending oppositely therefrom transversely of the torsion rod, a coupling spring connected between said nodal zone member and said frame member and constituting the sole support for said nodal zone member, and electrodynamic means coupled with said flexurally resonant arms for driving the arms into oscillation whereby the torsion rod is driven in counterphase oscillation.

14. The invention as defined in claim 13 wherein said flexural arms are fixed to said pedestal portion of the nodal zone member at a location opposite the mid-portion of said torsion rod.

15. The invention as defined in claim 14 wherein said coupling spring is fixed to said pedestal portion at a location opposite the mid-portion of said torsion rod.

16. The invention as defined in claim 15 including a mounting tube disposed over at least a portion of said nodal zone member and said torsion rod and being connected with said frame member.

17. The invention as defined in claim 16 wherein said electrodynamic means includes a pair of driving coils supported on said frame member and disposed opposite the respective free ends of said flexure arms, said flexure arms and said coupling spring being disposed on one side of said frame member and said mounting tube being disposed on the other side of said frame member.

18. The invention as defined in claim 17 wherein said oscillating mass on said torsion rod includes a permanent magnet, and a pickup coil mounted on said frame member adjacent said magnet.

19. A resonator comprising a frame member, a connecting member, a first resonant system including a torsion element having one end fixed to the connecting member and an oscillating mass fixed to the other end, a second resonant system including a pair of flexurally resonant elements extending in opposite directions from the connecting member and transversely of the torsion element, a coupling spring suspending said connecting member from said frame member, and means coupled with one of said resonant systems for driving it into oscillation whereby the other resonant system is driven in counterphase oscillation.

20. The invention as defined in claim 19 wherein said connecting member is a nodal zone member and wherein said torsion element and said flexurally resonant elements are fixed to the nodal zone member at spaced locations.

21. The invention as defined in claim 20 wherein said coupling spring comprises a pair of flat leaf portions parallel to said torsional axis in spaced relation and each portion being connected with the nodal zone member and with the frame member.

22. A resonator comprising a frame member, a nodal zone member, first and second resonant systems each being connected to different points on said nodal zone member, at least one of said resonant systems including a torsion element having one end fixed to the nodal zone member and an oscillating mass fixed to the other end, said nodal zone member having a torsional stiffness which is at least several times greater than the torsional stiffness of said torsion element whereby there is no significant relative movement of one portion of the nodal zone member to another portion thereof when the reaction torque for one resonant system is applied through the nodal zone member by the other resonant system, a coupling spring connected with said nodal zone member and suspending said nodal zone member from said frame member, and means coupled with one of said resonant systems for driving it into oscillation whereby the other resonant system is driven in counterphase oscillation.

* * * * *